(12) United States Patent
Spangler et al.

(10) Patent No.: US 7,007,090 B1
(45) Date of Patent: Feb. 28, 2006

(54) TECHNIQUES OF UTILIZING ACTUALLY UNUSED BANDWIDTH

(75) Inventors: Lynice S. Spangler, Portland, OR (US); Douglas M. MacLver, Portland, OR (US); Alexandre A. Klementiev, Portland, OR (US); Emmy C. Huang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/541,390

(22) Filed: Mar. 31, 2000

(51) Int. Cl.
*G06F 15/173* (2006.01)

(52) U.S. Cl. ............... 709/226; 709/223; 709/232; 709/234

(58) Field of Classification Search .......... 709/238, 709/226, 223, 224, 227, 231, 232, 234

See application file for complete search history.

(56) References Cited

U.S. PATENT DOCUMENTS

| 5,502,370 | A | * | 3/1996 | Hall et al. .................. 323/284 |
| 5,745,642 | A | * | 4/1998 | Ahn ............................ 386/95 |
| 5,884,037 | A | * | 3/1999 | Aras et al. ............. 395/200.56 |
| 5,940,738 | A | * | 8/1999 | Rao ........................... 455/4.2 |
| 5,951,637 | A | | 9/1999 | Kuzma |
| 5,996,013 | A | * | 11/1999 | Delp et al. .................. 709/226 |
| 6,240,460 | B1 | * | 5/2001 | Mitsutake et al. .......... 709/235 |
| 6,442,138 | B1 | * | 8/2002 | Yin et al. .................... 370/232 |

OTHER PUBLICATIONS

"Ethernet Bandwidth Management," IBM Technical Disclosure Bulletin, vol. 37, No. 3, Mar. 1994, pp. 591-594.*

* cited by examiner

*Primary Examiner*—Hosain Alam
*Assistant Examiner*—Liang-che Alex Wang
(74) *Attorney, Agent, or Firm*—Kevin A. Reif

(57) ABSTRACT

A determination is made whether information scheduled to be broadcast is utilizing all bandwidth previous allocated to broadcasting the information, and if not, additional information is broadcast using an unused portion of the previously allocated bandwidth.

11 Claims, 5 Drawing Sheets

TECHNIQUES OF UTILIZING ACTUALLY UNUSED BANDWIDTH

BACKGROUND

The invention relates to managing bandwidth in digital communication.

In typical digital communication, signals can be transmitted over a finite range of bandwidths, referred to as a pipe. Generally, a program or event, the relevant aggregate unit of content data, uses a specific portion of total pipe bandwidth during a specified period of time. For example, Program A might use 4 Mbps from 6 pm to 7 pm.

The pipe is not always used to its capacity. An event to which bandwidth has been allocated for a given period of time may not fill the bandwidth or it may fill the bandwidth for a shorter period. Unused bandwidth may be referred to as opportunistic bandwidth.

DESCRIPTION

Figure 1:
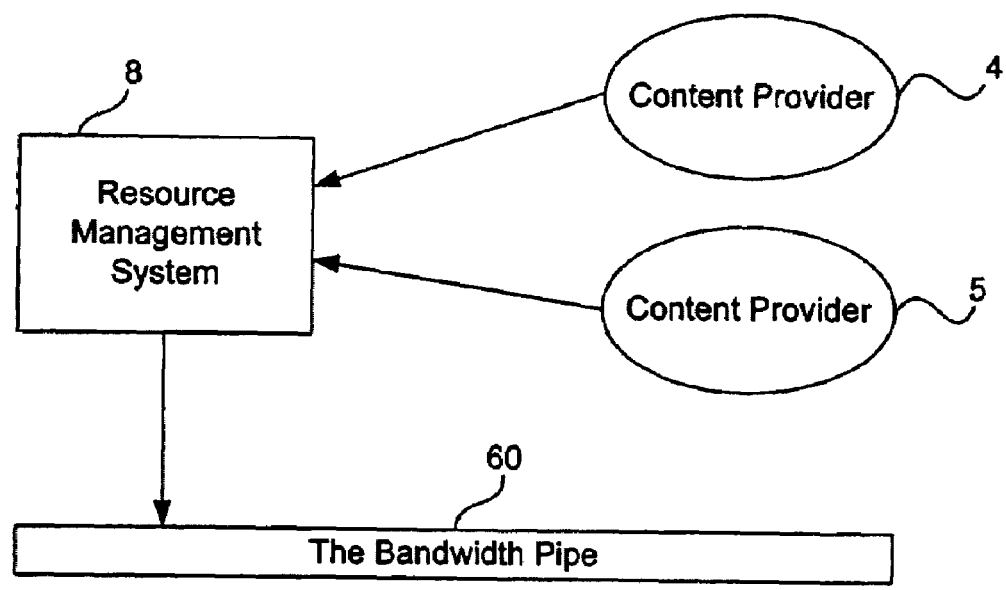
FIG. 1 is a schematic diagram of an exemplary digital communication system 2.

As shown in FIG. 1, an exemplary digital communication system 2 includes content providers 4, 5 that can send information to a resource management system 8. Two content providers 4, 5 are shown, but there can be any number of content providers. The information sent from providers 4, 5 contains data relating to digital content such as audio, visual or graphical data to be viewed or heard on a web page or a broadcast. Content providers send information in units called events. The event may be a television program, a radio commercial, a web page or any other unit of content that occupies single block of bandwidth and time. The information also contains scheduling information that pertains to the duration and bandwidth required by the various events. Also included is a type designator that enables the resource management system 8 to determine whether the content provider 4, 5 is requesting that the content be guaranteed a specified amount of time and bandwidth ("guaranteed content"), or instead, be included in the data broadcast opportunistically ("opportunistic content"), if time and bandwidth parameters allow.

The resource management system 8 determines whether bandwidth is available, and delivers opportunistic content over the bandwidth data stream ("bandwidth pipe") 60, which is the medium over which the digital data is carried. The bandwidth pipe 60 can be, for example, a cable or fiber optic network, a digital subscriber line, ISDN, or a satellite broadcast or other wireless digital communications medium. Any communication medium that accomplishes reception and transmission of digital information can be used.

The amount of bandwidth that the bandwidth pipe 60 can carry may be predetermined, which is the case if a propriety network or transmission line is used, or if a specified amount of bandwidth is guaranteed by a bandwidth provider. The discussion below assumes that the total amount of bandwidth available to be used by the resource management system 8 is fixed. However, in other embodiments, the total available bandwidth may vary over time. In that case, the bandwidth provider must coordinate usage amongst various competing bandwidth consumers by means of a protocol or sharing system. In such embodiments, the resource management system 8 would determine allocated and unallocated bandwidth dynamically, because the total available bandwidth would be subject to change.

Figure 2:
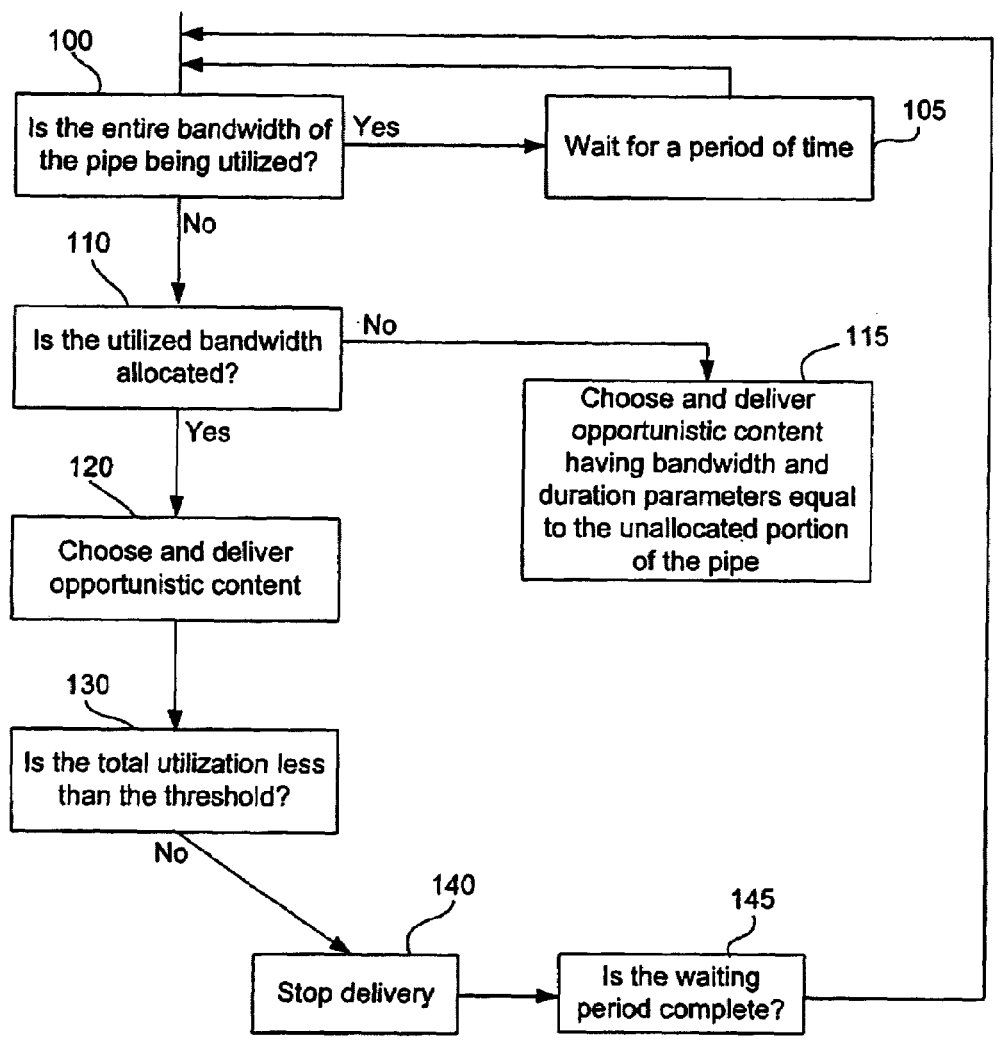
FIG. 2 is a flowchart of opportunistic bandwidth management.

As shown in FIG. 2, if the management system 8 determines 100 that the total bandwidth available to it is being used, the management system 8 waits 105 for a specified period before again determining, whether the total bandwidth continues to be used. The management system 8 cycles through repeated determinations until a portion of the total bandwidth becomes available for another use.

Figure 3:
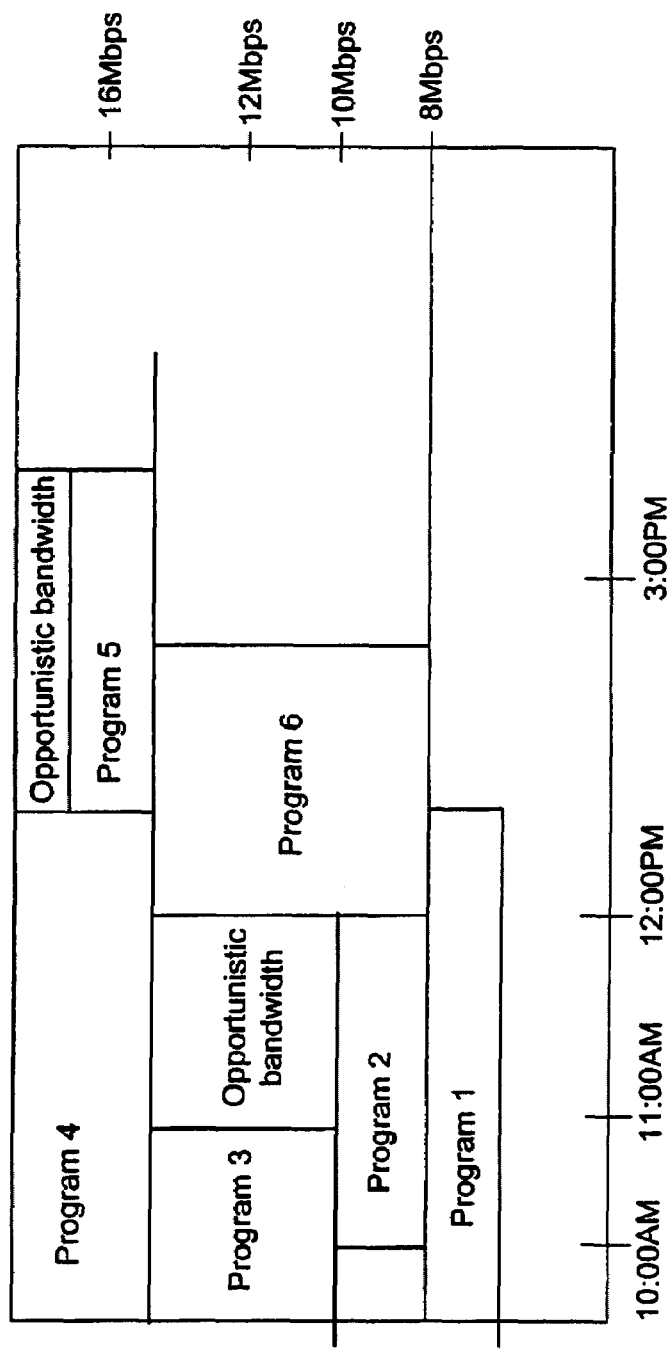
FIG. 3 shows an example of a schedule of allocated daily events in the bandwidth pipe.

If bandwidth becomes available, the management system 8 determines 110 whether the available bandwidth is allocated or unallocated. FIG. 3, which shows an exemplary schedule of allocated events, illustrates the distinction between allocated and unallocated bandwidth types. In FIG. 3, various events appear as rectangular blocks. In this simplified case, each program occupies a fixed amount of bandwidth for a given length of time. For instance, Program 2, is an event that has been scheduled or guaranteed to occupy 2 Mbps from 10:00 AM until 12:00 PM. Thus, Program 2 has been allocated 2 Mbps of bandwidth for a duration of 2 hours. Located to the upper right of the Program 2 rectangle lies a block denoted Opportunistic Bandwidth. Between 11:00 AM and 12:00 PM no events have been scheduled to occupy the bandwidth between 10 Mbps and 12 Mbps.

Returning to FIG. 2, if management system 8 determines that there is unallocated bandwidth in the bandwidth pipe, it chooses 115 opportunistic content that is able to fit into the unoccupied bandwidth for the proper duration, and delivers it to the bandwidth pipe 60 for broadcasting.

Portions of the bandwidth pipe 60 may be unused because guaranteed content that has been allocated a fixed amount of bandwidth for a fixed length of time, either does not fully utilize its guaranteed bandwidth or it does not fully use the bandwidth pipe for the full duration it has been allocated (or some combination of both of these causes for under utilization). If the management system 8 determines that the guaranteed content is not fully utilizing its guaranteed bandwidth, it will, as in the case of unallocated bandwidth, choose and deliver 120 opportunistic content to the bandwidth pipe 60.

In such cases, there is an added layer of complexity, because the management system 8 typically does not know how long the status of under-utilization will last. For example, content that has been guaranteed 2 Mbps for one hour may use only 1 Mbps for the first ten minutes and then fully utilize its allocation of 2 Mbps for the remainder of the hour. Therefore, to make sure that the opportunistic content does not interfere with guaranteed content, the management system 8 provides 130 opportunistic content up until a certain percentage, for example 90 percent, of the total bandwidth has been reached. That percentage, called the configurable rate, can be modified and adjusted.

If, for example, guaranteed content X is only using 85 percent of its allocated bandwidth, and the configurable rate is set to 90 percent, the management system 8 will provide opportunistic content comprising up to 5 percent of the allocated total, bringing utilization up to 90 percent. The management system 8 preferably does not provide opportunistic content to fill the remaining 10 percent because the system cannot tell ahead of time whether the guaranteed content will remain fixed at 85 percent of the allocated total. At any time the guaranteed content could increase its utilization. Therefore, the configurable rate provides some stability to the system by providing a threshold for opportunistic content that allows for modifications in the bandwidth utilization of the guaranteed content.

When the configurable rate threshold is reached, the management system 8 stops 140 the broadcast of the last opportunistic content added to the bandwidth pipe 60 or, if several different units of opportunistic content have been added, the management system 8 selects which unit of content to stop broadcasting based on various criteria, such as customer, bandwidth range or sequence of order placement. While the duration of the guaranteed event to which opportunistic content has been added lasts, the system 8 monitors 145 the delivered content, both guaranteed and opportunistic, to determine whether their combined-bandwidth remains under the threshold. When the guaranteed event concludes, the system 8 returns to the beginning of the process and monitors the bandwidth pipe 60 to determine whether the entire pipe is being utilized.

Figure 4:
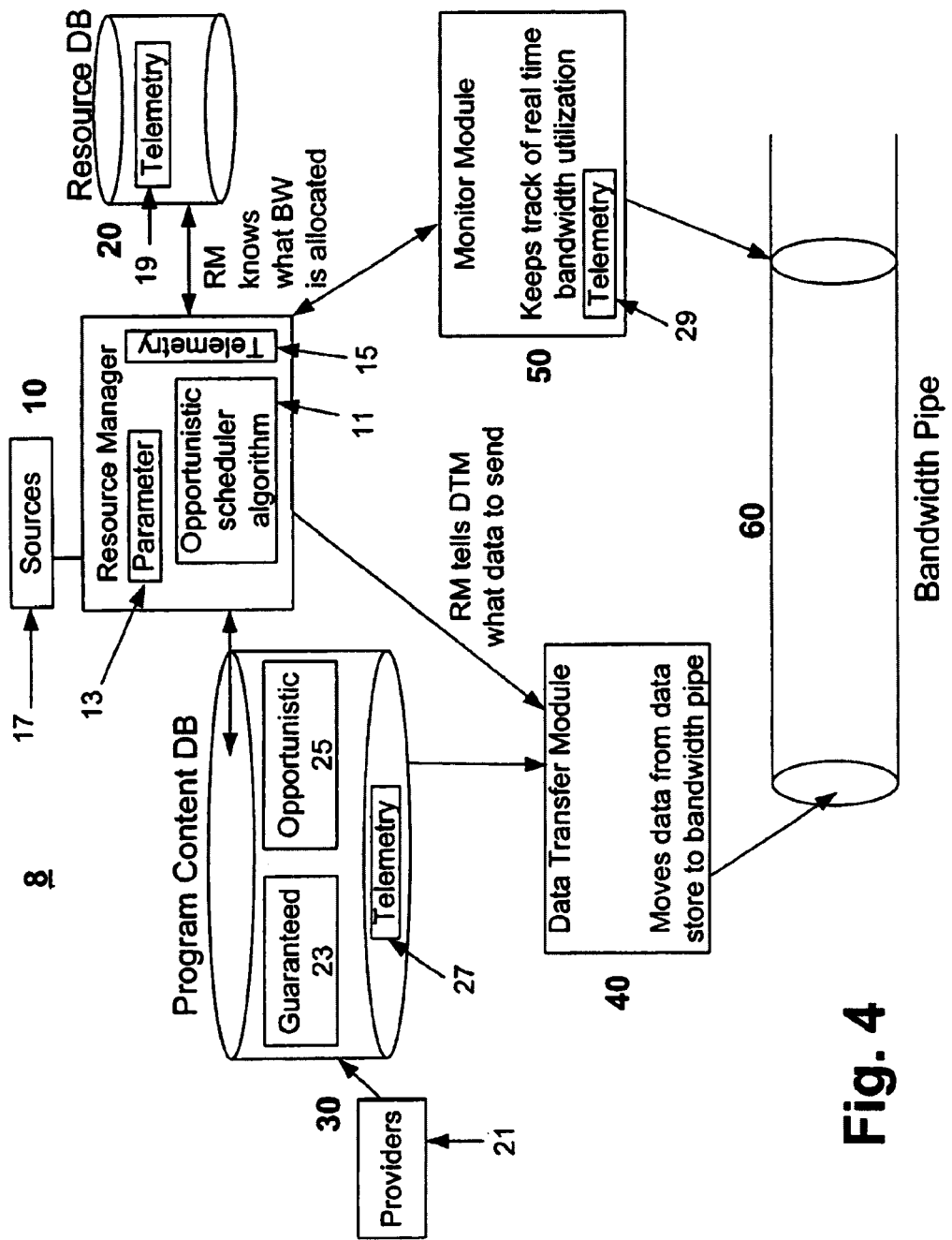
FIG. 4 shows an exemplary embodiment of a resource management system.

FIG. 4 illustrates details of an embodiment of the resource management system 8. The system 8 can include a resource manager 10 implemented, for example, as a computer or mainframe having both memory and processing capabilities. Manager 10 stores an opportunistic schedule algorithm 11 that contains the instructions required to execute the method for opportunistic bandwidth management described above. Configurable parameters 13, such as the configurable rate, which can be readily adjusted by system administrators, also are stored. The resource manager 10 also is equipped with a telemetry device 15 that enables it to transmit and receive data from outside sources 17.

A resource database 20, which can be, for example, a database server or a computer, maintains a record of the program time-slots and bandwidth allocations of the network bandwidth pipes 60. It is equipped with a telemetry device 19 so that it can transmit and receive data to and from the resource manager 10.

As shown in FIG. 4, the resource management system 8 also includes a program content database 30 that can be implemented, for example, as a database server or a mainframe. The database 30 stores the program content sent by the various content providers 21. The program content database 30 also stores the content delivery type, that is, whether the program content is guaranteed 23, intended for opportunistic use 25 or potentially some other class of delivery. This database 30 also is equipped with a telemetry device 27 that enables it to communicate with the resource manager 10 and transmit content data to a data transfer module 40.

The components of the system above, the resource manager 10, the resource database 20, and the program content database 30, have been presented as separate computing devices. This need not be the case, and in other embodiments all of these functional units can be components of a single mainframe, computer or server.

The data transfer module 40 connects directly to the bandwidth pipe 60. It can be implemented, for example, as a headend router, IP inserter box or other similar device. Data transfer module 40 receives data from the program content database 30 and delivers the data it receives to the bandwidth pipe 60. The program content database 30 will transmit data to the data transfer module 40 only upon receiving instructions to do so from the resource manager 10.

While the data transfer module 40 transmits data to the bandwidth pipe 60, a monitor module 50 receives and analyzes data from the pipe 60. The monitor module assesses the bandwidth utilization of the bandwidth pipe 60 in real time. The Module 50 can be implemented, for example, as an MPEG Analyzer™ available from Tektronics Inc. or an MPEGscope™ available from Hewlett-Packard.

The monitor module 50 is equipped with a telemetry device 29 that enables it to transmit data to the resource manager 10, which can then process the data and send instructions to other components of the system 8.

Figure 5:
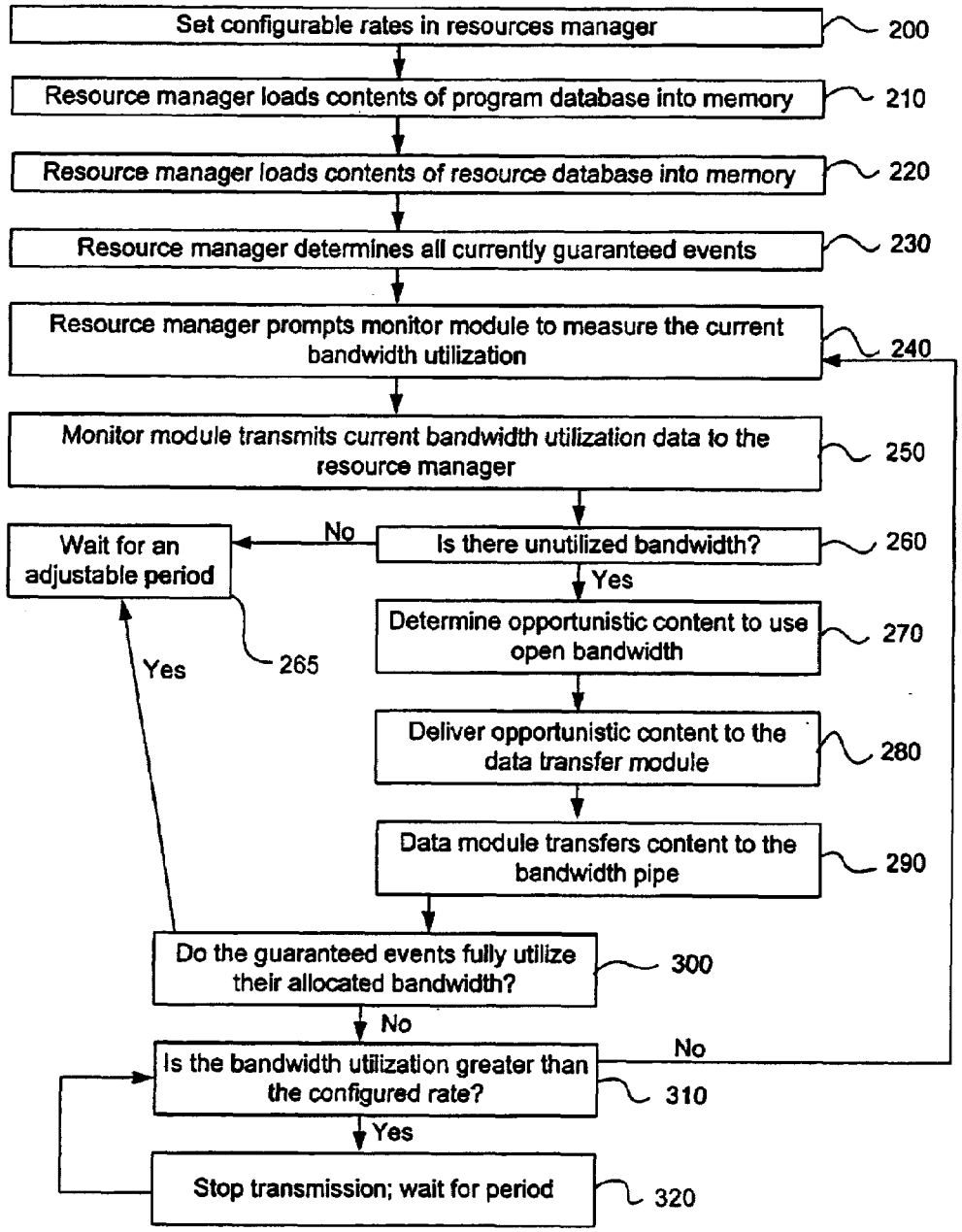
FIG. 5 is a flowchart of component interaction.

FIG. 5 sets out in greater detail how the system components of illustration FIG. 4 interact. First, the system is primed 200 properly, by setting each adjustable parameter, such as the configurable rate to a desired level. Next, the resource manager 10 loads 210, 220 the relevant contents of the program content database 30 and the resource database 20 into its memory. Based upon the information received from the program content database 30, the resource manager 10 determines 230 the duration and bandwidth of all currently scheduled events.

The resource manager 10 prompts 240 the monitor module 50 to measure the current bandwidth utilization in the pipe 60. The monitor module 50 then transmits 250 the current bandwidth utilization to the manager 10. The resource manager 10 Determines 260 whether there is any unutilized bandwidth 260.

If there is no unutilized bandwidth, the manager 10 waits 265 for an adjustable period before prompting 240 the monitor module 50 to take another reading. Alternatively, if there is unutilized bandwidth the manager 10 determines 270 the opportunistic content to occupy the unused portion of available bandwidth.

As previously mentioned, there are a variety of ways in which the manager 10 can insert content. The information obtained from the program content database 30 will indicate opportunistic content that has the appropriate characteristics to match the portions of available unutilized bandwidth. If the free bandwidth is unallocated, then the manager 10 calculates the exact bandwidths and durations of the opportunistic bandwidth blocks. The manager 10 can allocate an entire single block of bandwidth and time to a single unit of content, called "Opportunistic Exclusive" delivery, or it can divide either the bandwidth or time among multiple content units. In the case of bandwidth division the broadcast can be referred to as "Opportunistic Simultaneous" delivery and when the available time is divided among several content events it can be referred to as "Opportunistic Alternating" delivery. In any case, the method by which the manager 10 chooses 270 to deliver the content can be an adjustable feature of the management algorithm to provide flexibility.

After the content is chosen, the opportunistic events scheduled to be delivered are transmitted 280 to the data transfer module 50. The data transfer module 50 inserts 290 the content into the bandwidth pipe 60. Once opportunistic content has been inserted, the resource manager 10 must determine 300 whether open bandwidth is available because a portion of bandwidth has not been allocated, or, whether the guaranteed events are not fully using the bandwidth previously allocated to them. If bandwidth is available because a portion of the bandwidth has not been allocated, the resource manager 10 waits 265 for a period before measuring 240 utilization again.

By contrast, if the unutilized bandwidth is within a block of bandwidth-time that previously was allocated, care should be taken because the status of the free bandwidth is dynamic rather than static, in other words, the amount of opportunistic bandwidth can vary on a very short time scale. Hence, when the manager 10 sends out opportunistic content to a previously allocated block, it continually monitors the total utilization via the monitor module 50 to ascertain 310 whether by adding the opportunistic bandwidth, the total utilization increases beyond the configurable rate percentage. If that condition does occur, the manager 10 stops 320 the data transfer module 50 from inserting a portion of the opportunistic content that has been added. The manager 10 then queries 310 the monitor module 50 for a measurement of total utilization. A cycle of monitoring 310 and freezing 320 transmission will continue until utilization of the allocated bandwidth slot drops below the configurable rate. The manager 10 then prompts 240 the monitor 50 to make a regular measurement, starting the cycle over again.

Implementations of the invention may include one or more of the following advantages: the invention improves the efficiency of broadcasts by utilizing bandwidth that would normally be unused; the invention also provides flexibility by allowing significant parameters to be freely adjusted; the invention also promotes stability by ensuring that the additional information does not interfere with other broadcasts.

Various features of the system can be implemented in hardware, software, or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
   determining in real time whether information guaranteed a fixed amount of bandwidth for a fixed length of time broadcast digitally is actually utilizing all bandwidth previously allocated to broadcasting the information;
   if not, broadcasting additional information using an unused portion of the previously allocated bandwidth;
   limiting the amount of additional information to a preset percentage of the total available bandwidth,
   wherein said broadcasting of a portion of the additional information is stopped when the preset percentage is reached; and
   determining in real-time whether there is any unallocated bandwidth; and, if there is unallocated bandwidth with respect to a particular timeframe, broadcasting supplementary information to occupy at least a portion of the unallocated bandwidth during the particular timeframe.

2. The method of claim 1 including determining in real-time whether additional information can be broadcast over a portion of the previously allocated bandwidth that is actually unused.

3. The method of claim 1 wherein said broadcasting the portion of the additional information to be stopped is selected based upon at least one of content provider, bandwidth range and sequence of content provision.

4. The method of claim 1 including determining in advance of the particular timeframe whether the supplementary information can be broadcast over the unallocated bandwidth.

5. A digital communication system comprising:
   an automated management system that controls scheduling of digital broadcasts, and is configured to determine in real time whether information guaranteed a fixed amount of bandwidth for a fixed length of time broadcast actually utilizes all bandwidth previously allocated to broadcasting the information, and if not, to broadcast additional information using an unused portion of the previously allocated bandwidth,
   wherein the automated management system is configured to limit the amount of additional information to a preset percentage of the total available bandwidth,
   wherein the automated management system is configured to stop the broadcast of a portion of the additional information when the preset percentage is reached,
   wherein the automated management system is configured to determine whether there is any unallocated bandwidth; and, if there is unallocated bandwidth with respect to a particular timeframe, the system is configured to broadcast supplementary information to occupy at least a portion of the unallocated bandwidth during the particular timeframe.

6. The digital communication system of claim 5 wherein the automated management system is configured to determine whether additional information can be broadcast over a portion of the previously allocated bandwidth that is actually unused.

7. The digital communication system of claim 5 wherein the system is configured to select the portion of the additional information to be stopped based on at least one of content provider, bandwidth range, and sequence of content provision.

8. The digital communication system of claim 5 wherein the automated management system is configured to determine in advance of the particular timeframe whether the supplementary information can be broadcast over the unallocated bandwidth.

9. An article comprising a computer-readable medium which stores computer-executable instructions for causing a computer system to:
   determine in real time whether information guaranteed a fixed amount of bandwidth for a fixed length of time broadcast over a digital network is actually utilizing all bandwidth previously allocated to broadcasting the information;
   if not, broadcast additional information using an unused portion of the previously allocated bandwidth;
   limit the amount of additional information to a preset percentage of the available bandwidth;
   stop broadcasting a portion of additional information when the preset percentage is reached; and
   determine in real-time whether there is any unallocated bandwidth; and, if there is unallocated bandwidth with respect to a particular timeframe, broadcasting supplementary information to occupy at least a portion of the unallocated bandwidth during the particular timeframe.

10. The article of claim 9 which further stores instructions that cause the computer system to determine whether additional information can be broadcast over a portion of the previously allocated bandwidth that is actually unused.

11. The article of claim 9 which further stores instructions that cause a computer to stop broadcasting a portion of the additional information and wherein the portion of the additional information is selected based on at least one of content provider, bandwidth range and sequence of content provision.

* * * * *